United States Patent [19]
Saylor

[11] Patent Number: 5,739,531
[45] Date of Patent: Apr. 14, 1998

[54] SPRITE THERMAL IMAGING SYSTEM

[75] Inventor: Richard Saylor, Lake Hopatcong, N.J.

[73] Assignee: HE Holdings, Inc., Los Angeles, Calif.

[21] Appl. No.: 797,795

[22] Filed: Feb. 7, 1997

[51] Int. Cl.[6] .......................... H01L 27/146; H01L 31/00
[52] U.S. Cl. ........................ 250/334; 250/370.08
[58] Field of Search ..................... 250/338.1, 338.4, 250/332, 334, 347, 349, 370.08

[56] References Cited

U.S. PATENT DOCUMENTS

| | | |
|---|---|---|
| 4,467,201 | 8/1984 | Blackburn et al. ............ 250/370.08 X |
| 4,868,389 | 9/1989 | Moore ............................ 250/332 |
| 4,883,962 | 11/1989 | Elliott ........................ 250/370.08 X |

*Primary Examiner*—Edward J. Glick
*Attorney, Agent, or Firm*—W. C. Schubert; W. K. Denson-Low

[57] ABSTRACT

A signal processing in the element (SPRITE) thermal imaging system (20) is provided which has automatic gain control, level control, and delining. An array of SPRITE detectors (22) generate a plurality of analog signals which are proportional to the flux of infrared light received by each of the detectors (22). A digital scan converter (137) processes the analog signals and generates a resultant digital output (188) which contains digital image data for image production. A first plurality of sample-servo control loops (278, 280, 282, 284) provides automatic gain control using the digital output (188) and a second plurality of sample-servo control loops (286, 288, 290, 292) provides automatic level control using the digital output (188). A deliner is provided for normalizing differences which result from variations between detectors (22). The deliner normalizes the differences by utilizing one pair of the first and second sample-servo control loops as a reference pair (236) to provide gain and level references to the other pairs of the first (278, 280, 282) and second (286, 288, 290) sample-servo control loops.

18 Claims, 5 Drawing Sheets

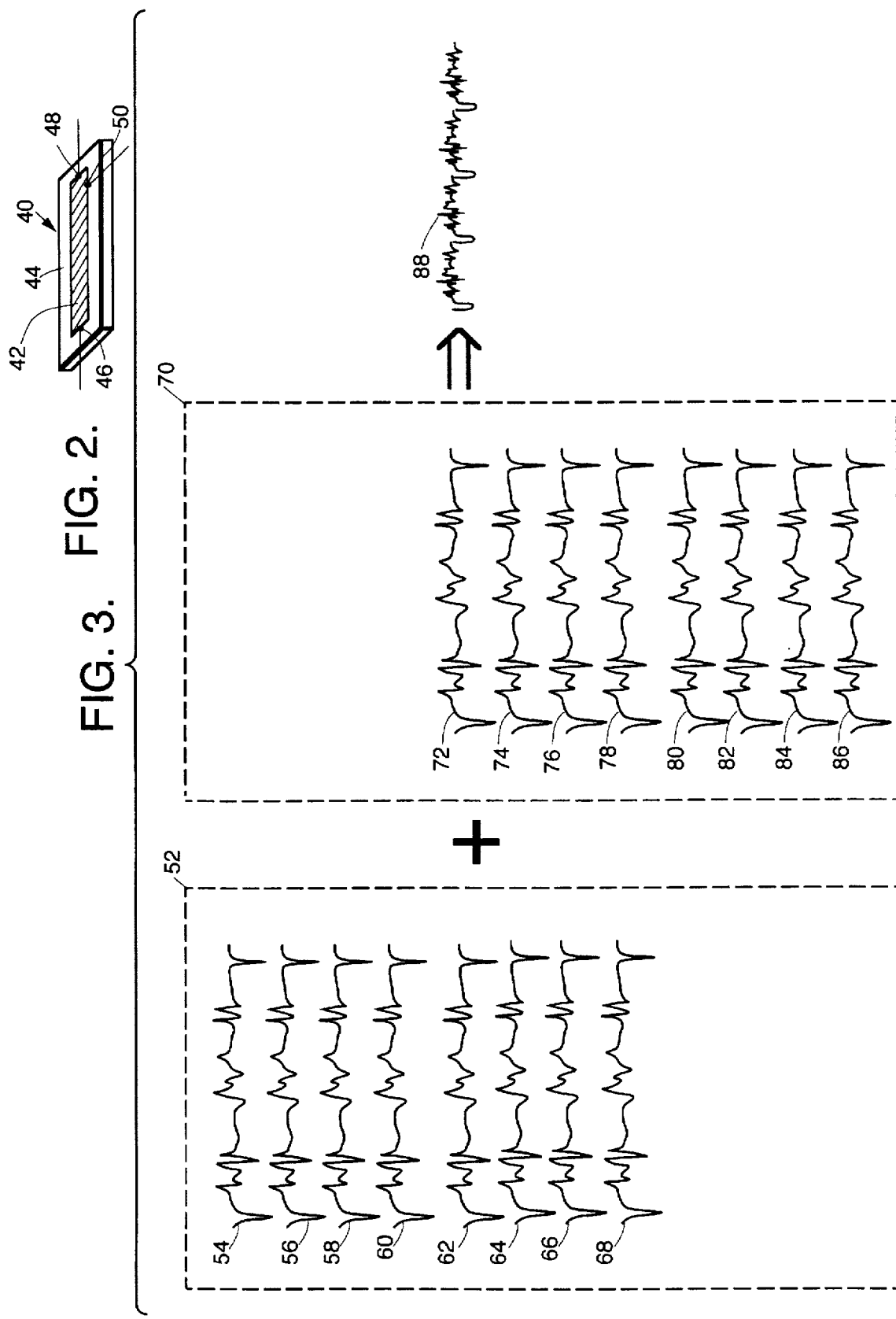

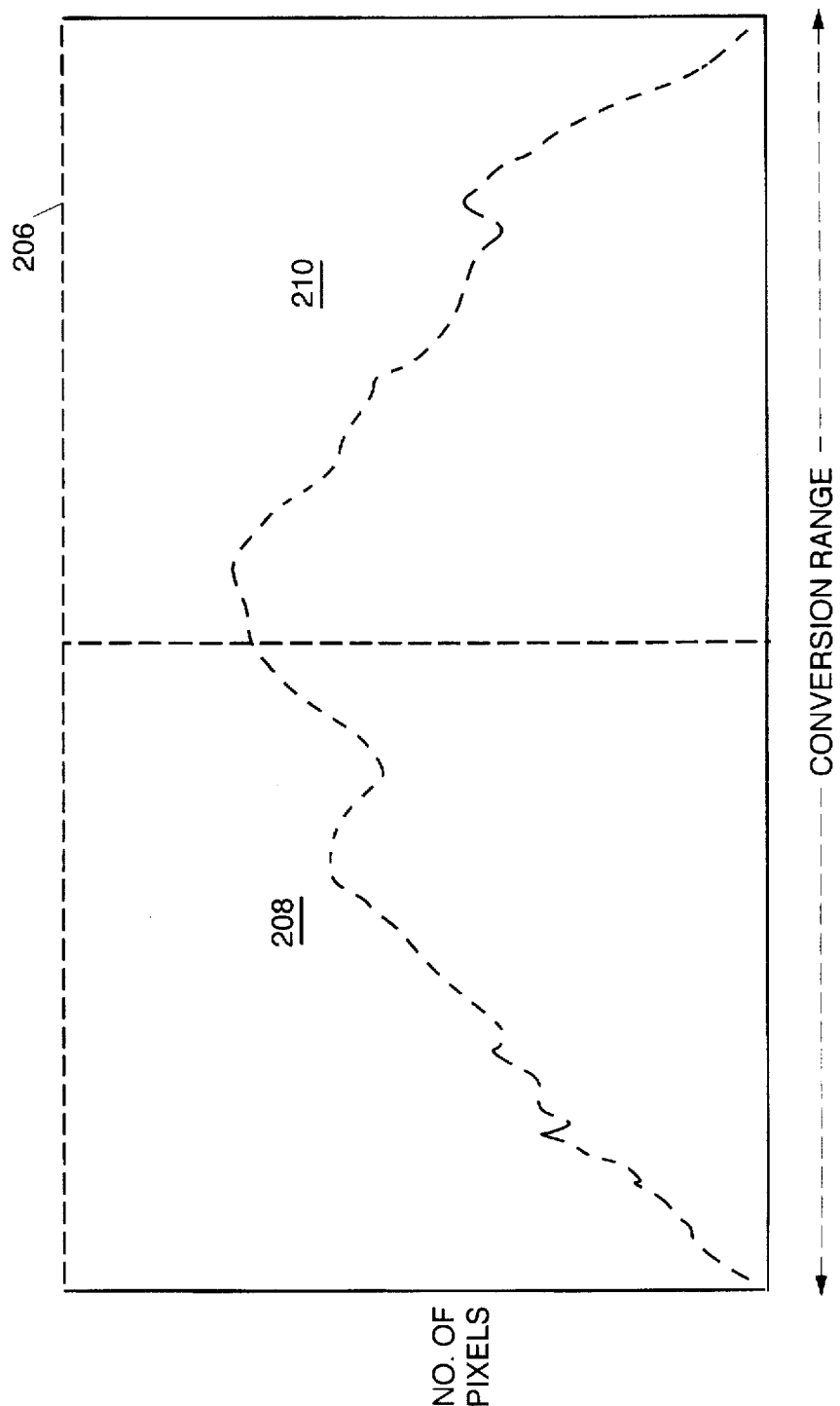

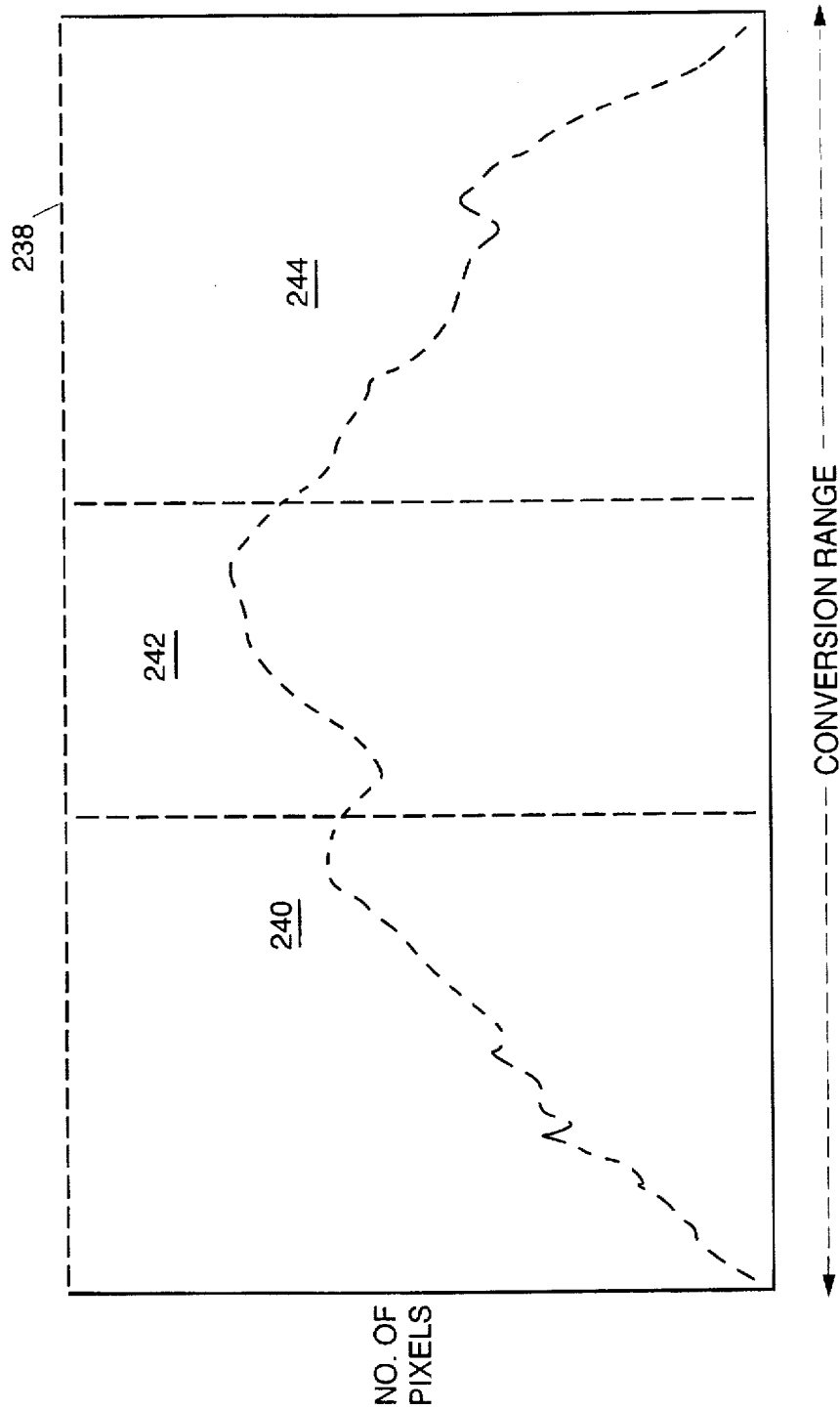

SPRITE THERMAL IMAGING SYSTEM

BACKGROUND OF THE INVENTION

1. Field of the Invention

The present invention is directed to thermal imaging systems, and is more particularly directed to a system and methodology for providing automatic gain control, level control, and delining in an infrared imaging system which utilizes signal processing in the element (SPRITE) detectors.

2. Description of Related Art

Scanning thermal imaging systems are used in a variety of applications, including surveillance systems and target detection/recognition systems. Such systems typically incorporate a telescopic lens assembly coupled to a scanner. The scanner scans energy from a scene through an imager lens assembly onto a detector array having a plurality of photo-electrically responsive detector elements perpendicular to the scan direction. Each of these detector elements provides an electric signal proportional to the flux of infrared light on the particular detector element. Electric signals generated from the detector elements are subsequently processed by system sensor electronics to create an image that is displayed on a system output device.

During imaging system operation, an operator is required to survey a designated sector for potential targets (e.g., 60 degree azimuth by 20 degree elevation). As the operator slews the telescopic lens of the imaging system across the designated sector, the background often changes due to horizon lines or cloud edges. Once this type of change occurs, adjustments must be made to the system gain and level to ensure potential targets are not obscured as a result of being beyond dynamic range limits. Prior to the present invention, this adjustment was performed manually, requiring operator time, thereby reducing the speed in which the operator could cover the sector.

Effective gain and level enhancement requires two types of control. The first type adjusts the overall scene brightness and contrast, and the second type individually calibrates each sensor channel in order to normalize the differences that result from variations in the detector elements and tolerances of the channel amplifiers. This second type of control is referred to as delining. Delining is not only important for aesthetics, but is also important to lower minimum resolvable temperature (MRT). With a lower MRT, system sensitivity is improved, allowing detection of a target at a greater distance.

In SPRITE systems, gain control, level control, and delining present a number of difficulties that are a result of the fact that the SPRITE configuration consists of eight elements, each of which has its own processing circuits. Normal variations of the SPRITE characteristics from element to element cause variations in the level and amplitude from line to line within the scene. Furthermore, normal tolerance variations of the electronic components cause further variations. These variations cannot be compensated by preset adjustments, because they change as a function of time, temperature, and in some cases, scene content.

Therefore, it is the object of the present invention to provide a system and methodology for providing automatic gain control, level control, including delining for a thermal imaging system which uses signal processing in the element detectors. This will reduce the workload of an operator, reduce the time necessary for completion of sector scans, and allow the operator to concentrate on their primary functions of detection and recognition without the distractions associated with manual adjustments.

SUMMARY OF THE INVENTION

In accordance with the teachings of the present invention, a signal processing in the element (SPRITE) thermal imaging system is provided which has automatic gain control, level control, and delining. An array of SPRITE detectors generate a plurality of analog signals which are proportional to the flux of infrared light received by each of the detectors. A digital scan converter processes the signals generated by the detectors and generates a resultant digital output which contains digital image data for image production. A first plurality of sample-servo control loops provide automatic gain control using the resultant digital output and a second plurality of sample-servo control loops provide automatic level control using the digital output. Delining means is provided for normalizing differences which result from variations between detectors. The delining means normalizes the differences by utilizing one pair of the first and second sample-servo control loops as a reference pair to provide gain and level references to the other pairs of the first and second sample-servo control loops.

BRIEF DESCRIPTION OF THE DRAWINGS

Other objects and advantages of the invention will become apparent upon reading the following detailed description and upon reference to the following drawings, in which:

FIG. 2 is a perspective view of the structure of a SPRITE detector;

FIG. 3 is a waveform diagram illustrating the methodology used in conjunction with the SPRITE detectors in order to produce an infrared image;

FIG. 4 is a typical level histogram which is analyzed as a part of the level control of the preferred embodiment of the present invention; and FIG. 5 is a typical gain histogram which is analyzed as a part of the gain control of the preferred embodiment of the present invention.

DESCRIPTION OF THE PREFERRED EMBODIMENTS

The following description of the preferred embodiment is merely exemplary in nature and is in no way intended to limit the invention or its application or uses.

Figure 1A:
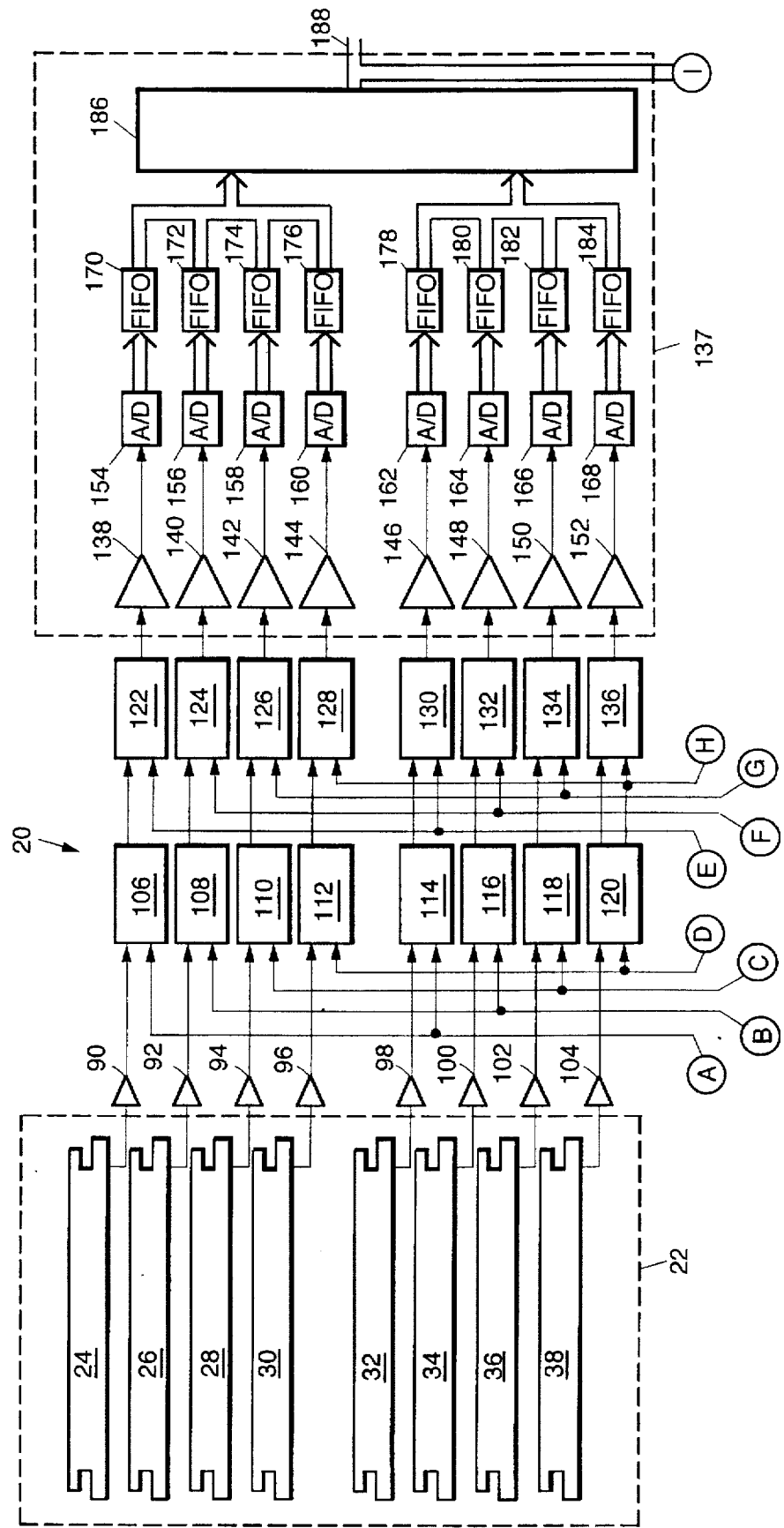
FIG. 1(a–b) form a schematic diagram of the imaging system having gain control and level control, including delining, of the preferred embodiment of the present invention.
Figure 1B:
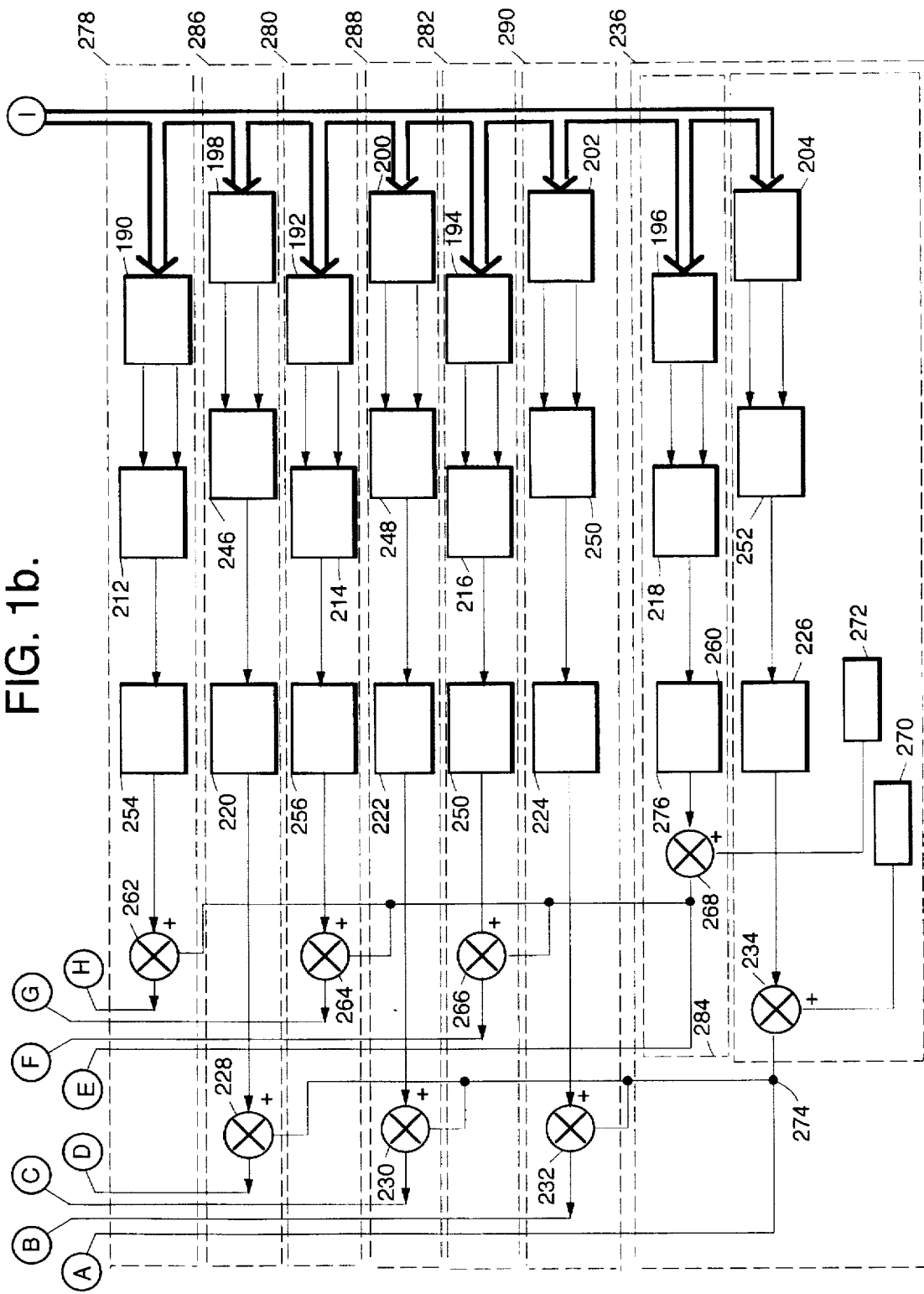

FIG. 1 shows the Infrared imaging system 20 having automatic gain and level control, including delining, of the preferred embodiment of the present invention. The gain control, level control, and deliner are part of an imaging system 20 which utilizes a detector array 22 composed of eight Signal Processing In The Element (SPRITE) detectors (24, 26, 28, 30, 32, 34, 36, 38) with a scanning technique arranged for series-parallel scanning to generate an infrared image.

FIG. 2 illustrates the structure of an individual SPRITE detector 40. The detector 40 is constructed of a photoconductive mercury cadmium telluride (HgCdTd) strip 42 embedded in a sapphire substrate frame 44. The strip 42 has a first bias contact 46 located at one end, and a second bias contact 48 located at the end opposite the first bias contact 46. A bias voltage is applied to the contacts (46, 48) which causes the excess carriers to drift towards a readout electrode 50 placed in the vicinity of the second bias contact 48. With a drift velocity matching the rate at which an image is scanned across the strip 42, an effective time delay and integration (TDI) is produced.

The eight SPRITE detectors of the preferred embodiment are used by the imaging system in the following manner. As shown in FIG. 3, a horizontal scan of the eight SPRITE detectors produces a first swath 52 of eight lines (54, 56, 58, 60, 62, 64, 66, 68). Subsequently, a second horizontal scan is performed, generating a second swath 70 of eight lines (72, 74, 76, 78, 80, 82, 84, 86) which is displaced from the first swath 52 by four. As can be seen, the first four detectors of the second scan generate signals representing an image which are the same as the signals produced by the second four detectors during the first scan. The data corresponding to the first four elements of the most recent scan (represented by second swath 70 lines (72, 74, 76, 78)) are added to the data corresponding to the second four elements of the previous scan (represented by first swath 52 lines (62, 64, 66, 68, 70). This produces a resultant signal 88 which is double the signal received by an individual SPRITE detector, however since the noise from each of the eight elements is uncorrelated, the noise only increases by the square root of two. Therefore, the signal-to-noise ratio is improved by a factor of 1.41.

Referring to FIG. 1, in order to accomplish the above-described operation, the signal from each SPRITE detector (24, 26, 28, 30, 32, 34, 36, 38) is first provided to a preamplifier (90, 92, 94, 96, 98, 100, 102, 104) for preamplification. The preamplified signal from each detector is then provided to a level shifter (106, 108, 110, 112, 114, 116, 118, 120) and multiplier (122, 124, 126, 128, 130, 132, 134, 136) which provide controllable dc offset (level) and gain, respectively. This is followed with a signal processing by the digital scan converter 137.

The digital scan converter 137 provides a signal amplification with a channel amplifier (138, 140, 142, 144, 146, 148, 150, 152) before digital conversion by an analog-to-digital (A/D) converter (154, 156, 158, 160, 162, 164, 166, 168).

First-in-first-out (FIFO) memory devices (170, 172, 174, 176, 178, 180, 182, 184) are used to store the pixel data from the A/D converters (154, 156, 158, 160, 162, 164, 166, 168). These FIFO memory devices (170, 172, 174, 176, 178, 180, 182, 184) read and write simultaneously and at different frequencies to provide a single 8-bit bus that contains serial pixel data. This serial pixel data from the FIFOs (170, 172, 174, 176), having data corresponding to the first four SPRITE detectors, are added by digital adder circuit 186 to the serial pixel data from the FIFOs (178, 180, 182, 184) having the signals corresponding to the second four SPRITE detectors of the previous scan. This provides a resultant output 188, which has the desirable characteristics as discussed in conjunction with FIG. 4. The resultant output 188 containing the image data received by the SPRITE detectors, is then provided to a display D/A (not shown) for image production. However, before the output containing the image data is converted to analog for display generation, the resultant output 188 is captured for gain control, level control, and delining through the use of the gain sample-data servo systems (278, 280, 282, 284) and level sample-data servo systems (286, 288, 290, 292).

Gain control, level control, and delining are provided through analysis of the resultant output data while in the digital domain. After the digital analysis, resultant control data generated from analysis is converted to analog for control. This preserves the full 255 steps of digital resolution, which is not the case in other systems that perform all corrections in the digital domain. Systems that perform all corrections in the digital domain require many more steps of digital resolution in order to provide the additional range necessary for level and gain adjustments. Typically, 12 bit systems are used as compared to the 8 bit system of the preferred embodiment. The 12 bit systems are significantly larger and more costly.

Prior to analog conversion by the display D/A (not shown), the resultant output 188, containing the digital image data, is received by gain histogram analyzers (190, 192, 194, 196) and level histogram analyzers (198, 200, 202, 204). The gain histogram analyzers (190, 192, 194, 196) and level histogram analyzers (198, 200, 202, 204) perform an analysis of the resultant output 188 through an evaluation of a histogram. A typical histogram for level analysis is shown in FIG. 4, and a typical gain histogram for gain analysis is shown in FIG. 5.

Referring to FIG. 4, the level histogram 206 is divided into two regions for purposes of analysis, an upper half region 208 and lower half region 210. During analysis, display pixels are identified as being in the upper half region 208 or lower half region 210.

Referring to FIG. 1, pixel region identification is performed by the level analyzers (198, 200, 202, 204). Pixels found to be in the upper half region cause a level up/down counter (246, 248, 250, 252) to increment, while pixels in the lower half region cause a level up/down counter (246, 248, 250, 252) to decrement. This is done on a continuing basis, resulting in a count that represents the integral of the level error at a given time.

The current value of each level up/down counter (246, 248, 250, 252) is fed to a level D/A converter (220, 222, 224, 226). The analog signal from the level D/A converter (220, 222, 224, 226) is compared to a reference level by a level comparator (228, 230, 232, 234). (Note that the source of each reference level will be subsequently discussed in relation to delining.) This produces a level error signal which is fed to a corresponding level shifter, thereby forming an integral level correction loop.

Referring to FIG. 5, a similar process is used for gain control except that the gain histogram 238 is divided into three areas for the purpose of analysis. The three areas consist of a low region 240, center region 242, and high region 244. During analysis, display pixels are identified as being in the low region 240, high region 244, or the center region 242. Referring to FIG. 1, pixel region identification is performed by gain analyzers (190, 192, 194, 196). Pixels found to be in the low region or high region cause a gain up/down counter (212, 214, 216, 218) to increment, while pixels in the center region cause a gain up/down counter (212, 214, 216, 218) to decrement. As with the level control, this is done on a continuing basis. When the gain up/down counter (212, 214, 216, 218) is at its mid count, the number of pixels in the center region equals the number of pixels in both the low region and high region 244. In this situation, the signal amplitude is at its normal value. Any other value represents the integral of the amplitude error.

The values of the gain up/down counters (212, 214, 216, 218) are fed to the gain D/A converters (254, 256, 258, 260). The analog signal from each gain D/A converter (254, 256, 258, 260) is compared to a gain reference level by a gain comparator (262). (Note that the source of each gain reference level will be subsequently discussed in relation to delining.) This produces a gain error signal forming an integral gain corrective loop.

As previously described, each detector channel has a level shifter (106, 108, 110, 112, 114, 116, 118, 120) and a multiplier (122, 124, 126, 128, 130, 132, 134, 136) for level and gain control. The level shifter (106, 108, 110, 112, 114, 116, 118, 120) is used to adjust the dc offset which in turn adjusts the brightness for that particular channel. The multiplier (122, 124, 126, 128, 130, 132, 134, 136) is used to adjust the gain. Gain adjustment is a process of multiplication. For example, to increase the gain by 10%, the signal needs to be multiplied by a factor of 1.1. The effect of a gain adjustment is to vary the image contrast for the particular channel.

Even though there are eight detector channels, it is only necessary to develop four sets of gain and level control signals. This is due to the addition of channel data in pairs. For each channel pair, only the resultant sum is important. The individual values of each member of a pair is of less importance. Accordingly, only one set of level and gain control signals is derived for each channel pair, specifically, channel pairs corresponding to detectors one (24) and five (32), two (26) and six (34), three (28) and seven (36) and four (30) and eight (38) receive the same error signals from the gain comparators (262, 264, 266, 268) and level comparators (228, 230, 232, 234), respectively.

As previously indicated, delining involves maintaining the same signal level and amplitude for all the channels. If this type of control is not available, line structure will become apparent, and this will tend to obscure faint targets. Therefore, delining is critical to imaging system operation. It should be noted that overall gain and level control is not as critical, as long as the channels are properly balanced.

Both gain and level adjustments are involved in delining. This can be seen from two examples. First consider a scene with no gradations, such as a perfectly clear sky. In this situation, an unbalanced dc offset (level) will create line structure. The second example involves a scene with too much contrast. In this case, even if the levels are well balance, line structure will appear in the brightest and darkest regions if the gains are unbalanced.

The present invention provides delining control with the following configuration. One pair of channels is defined as the reference pair 236. This pair 236 is adjusted to obtain the level and gain values that are desired for the overall scene. This is accomplished with the reference level input 270 and reference gain input 272. The control signals for the other channels are obtained by comparing the level error and gain error (output values) of each channel pair with the resultant level error 274 and resultant gain error 276 of the reference pair 236. This direct comparison process yields a finer line-to-line balance than would be obtained if each pair were individually adjusted for overall scene brightness and contrast.

For the reference pair 236, this is accomplished by having the output of the gain and level D/A converters (260, 226) of the reference pair 236 compared to the reference level input 270 and reference gain input 272 and then supplied directly to the corresponding level shifters (106, 114) and multipliers (122, 130) after comparison with the reference level input 270 and reference gain input 272. However, for the other three channel pairs, the error control signals provided to their corresponding level shifters and multipliers are derived by subtracting the D/A outputs from the resultant control signals of the reference pair 236. A null signal results when all channels are matched to the reference pair 236. This provides the desired balance in the signal levels and amplitudes for each pair, thereby providing the critical deliner function.

As previously indicated, the gain and level control loops are sample-data servo systems, with a histogram analysis made at the end of each display field. This means that the data used to increment the up-down counters is always delayed by 1/60th second (field period) from when the data was valid. This delay represents a phase shift that increases with frequency. According to well known servo theory, the open loop gain and bandwidth of a servo must be optimized to provide a balance between speed of response and stability. The optimum gain and bandwidth is a direct function of the phase characteristic. If the gain is too low, the loop will respond very slowly and will not be able to follow changes of scene. If the gain is too high, the loop will have damped oscillations or may even oscillate continuously. The result would be that even with a fixed scene, the brightness and contrast of the display would constantly change.

This problem is due to the inclusion of multipliers in the control loops. The multiplier is inherently a variable gain device. In the case of the gain control loop, the multiplier causes the loop gain to increase as a function of average signal amplitude and therefore inversely to signal channel gain. In the case of the level control loop, the loop gain varies directly with the signal channel gain. As a result of the above considerations, if optimum response is to be maintained over a range of scene conditions, it is necessary to compensate the open loop gain of each control loop as a function of forward signal gain.

Optimization is achieved by taking advantage of the up-down counter characteristics. As has been discussed, the counters count up when one input is asserted, and count down when the other input is asserted. With neither input asserted, the counters hold their count. The frequency of counting is determined by a clock frequency. By changing this clock frequency, the rate which the output changes per unit time is changed in direct proportion. So to optimize the gain loop, the counter clock frequencies are varied in direct proportion to the forward signal gain. The clock frequencies for the level loop are varied inversely to the forward signal channel gain. In this way, open loop gain variations caused by the multipliers are effectively cancelled.

The imaging system as presented provides a system and methodology for automatic gain control, level control, including delining. This system will allow reduction in the workload of the system operator, reduce the time necessary to complete a sector scan, and allow operator concentration to remain with the primary functions of detection and recognition.

Various other advantages of the present invention will become apparent to those skilled in the art after having the benefit of studying the foregoing text and drawings, taken in conjunction with the following claims.

What is claimed is:

1. A signal processing in the element (SPRITE) thermal imaging system having automatic gain control, level control, and delining, comprising:

an array of SPRITE detectors for generating a plurality of analog signals which are proportional to the flux of infrared light received by each of said detectors;

a digital scan converter for processing said analog signals generated by said detectors and generating a resultant digital output which contains digital image data for image production of a scene;

a first plurality of sample-servo control loops for providing automatic gain control, said first sample-servo control loops utilizing said digital output;

a second plurality of sample-servo control loops for providing automatic level control, said second sample-servo control loops utilizing said digital output; and delining means for normalizing differences which result from variations between detectors, said delining means utilizing one pair of said first and second sample-servo control loops as a reference pair to provide gain and level references to the other pairs of the first and second sample-servo control loops.

2. The system of claim 1 wherein said SPRITE detectors are constructed of a photoconductive mercury cadmium telluride (HgCdTd) strip embedded in a sapphire substrate frame, said strip having a first bias contact located at a first end and a second bias contact located at a second end which is opposite said first end.

3. The system of claim 1 wherein said array of SPRITE detectors is an array of eight SPRITE detectors.

4. The system of claim 1 wherein said digital scan converter has a plurality of amplifiers for amplifying said analog signals.

5. The system of claim 1 wherein said digital scan converter has a plurality of analog-to-digital converters for converting said analog signals into digital form.

6. The system of claim 1 wherein said digital scan converter has a plurality of first-in/first-out (FIFO) memory devices for reading and writing simultaneously and at different frequencies to provide a plurality of multi-bit buses that contain serial pixel data.

7. The system of claim 1 wherein said digital scan converter has an adder that conducts a summation process with the result being said digital output.

8. The system of claim 1 wherein said first sample-servo control loops have a plurality of gain histogram analyzers performing an analysis of said digital output and causing a plurality of gain up/down counters to determine a plurality of first values which represent the integrals of amplitude error of said system.

9. The system of claim 8 wherein said first sample-servo control loops have a plurality of gain comparators which compare said integrals of amplitude error to a plurality of reference gains, said gain comparators producing a plurality of gain errors which are transmitted to a plurality of multipliers for gain adjustment.

10. The system of claim 1 wherein said second sample-servo control loops have a plurality of level histogram analyzers performing an analysis of said digital output and causing a plurality of level up/down counters to determine a plurality of second values which represent the integrals of level error of said system.

11. The system of claim 10 wherein said second sample-servo control loops have a plurality of level comparators which compare said integrals of level error to a plurality of reference levels, said level comparators producing a plurality of level errors which are transmitted to a plurality of level shifters for level adjustment.

12. The system of claim 1 wherein said analog signals are initially presented to a plurality of preamplifiers for preamplification.

13. A method of providing gain control, level control, and delining in a signal processing in the element (SPRITE) system, comprising:

generating a plurality of analog signals with an array of SPRITE detectors, said analog signals being proportional to the flux of infrared light received by each of said detectors;

processing said analog signals generated by said detectors with a digital scan converter to generate a resultant digital output which contains digital image data for image production of a scene;

providing automatic gain control with a first plurality of sample-servo control loops which utilize said digital output;

providing automatic level control with a second plurality of sample-servo control loops which utilize said digital output; and normalizing differences which result from variations between detectors with a delining means, said delining means utilizing one pair of said first and second sample-servo control loops as a reference pair to provide gain and level references to the other pairs of first and second sample-servo control loops.

14. The method of claim 13 wherein said array of SPRITE detectors is an array of eight SPRITE detectors.

15. The method of claim 13 wherein the step of providing automatic gain control comprises the steps of:

identifying display pixels as being in a particular region of a gain histogram;

counting the number of pixels identified in said region with the result representing the integral of the gain error at a given time;

converting said result to analog with a digital to analog converter and generating an analog gain result; and comparing said analog gain result to a reference gain input that produces a gain error signal which is provided as feedback for automatic gain adjustment.

16. The method of claim 13 wherein the step of providing automatic level control comprises the steps of:

identifying display pixels as being in a particular region of a level histogram;

counting the number of pixels identified in said region with the result representing the integral of the level error at a given time;

converting said result to analog with a digital to analog converter and generating an analog level result; and comparing said analog level result to a reference level input that produces a level error signal which is provided as feedback for automatic gain adjustment.

17. The method of claim 13 wherein said SPRITE detectors are constructed of a photoconductive mercury cadmium telluride (HgCdTd) strip embedded in a sapphire substrate frame, said strip having a first bias contact located at a first end and a second bias contact located at a second end which is opposite said first end.

18. The method of claim 14, further comprising the step of preamplifying said plurality of analog signals generated by said array of signal processing in the element detectors.

* * * * *